Oct. 22, 1963   D. C. PALM   3,107,953
BUSHING ASSEMBLY
Original Filed April 24, 1957
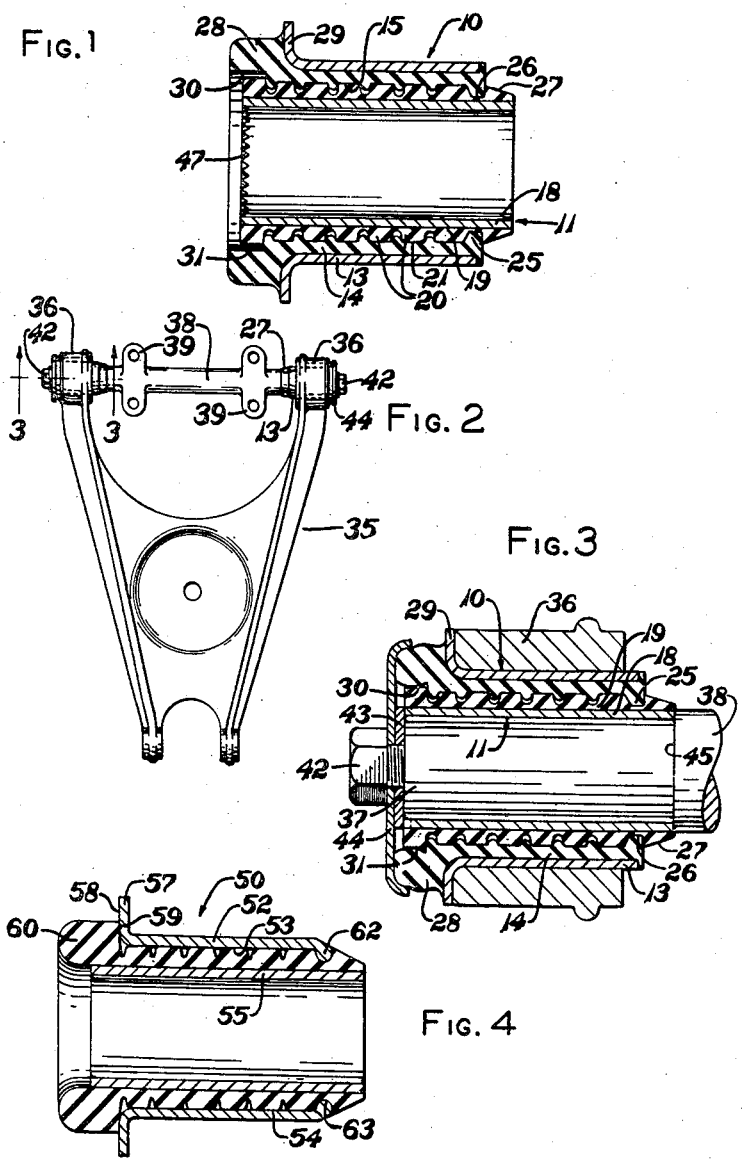

3,107,953
BUSHING ASSEMBLY
Donald C. Palm, Cuyahoga Falls, Ohio, assignor to The
B. F. Goodrich Company, New York, N.Y., a corporation of New York
Original application Apr. 24, 1957, Ser. No. 654,948.
Divided and this application May 29, 1961, Ser. No. 113,407
2 Claims. (Cl. 308—36.1)

This invention relates to pivotal joints and more particularly to an improved resilient pivotal bushing assembly for use as a resilient connector between pivotal links and the like. This application is a division of my co-pending application Serial No. 654,948, filed April 24, 1957, now abandoned.

The bushing assembly of this invention provides for substantially unimpeded pivotal movement of the parts it interconnects throughout a wide oscillating range together with resilient cushioning of shock forces transmitted to the bushing. In view of these characteristics these bushings are especially useful in automotive wheel suspension mechanisms for connecting links of the suspension mechanisms to the vehicle frame. One particular advantage of these bushings for this purpose is that they do not impose a so-called "parasitic drag" on the springing action of the main suspension springs, which is an objectionable feature of the rubber torsion-type bushing assemblies which have been heretofore used for this purpose.

A resilient pivotal bushing assembly according to this invention in general includes a pair of concentric bushing members having opposing bearing surfaces extending axially of the bushing members upon which surfaces the bushing members are rotatable relative to each other. Also there are transverse bearing surfaces at one end of the members adapted for mutual rotary engagement. The axial bearing surface of the least one of the bushing members is defined by the series of resilient rubber ribs spaced apart axially of the assembly and which are rotatably engaged with the bearing surface of the opposing bushing member. At least one of the transverse bearing surfaces is formed on a resilient rubber part. Means is provided adjacent at least one end of the assembly for resiliently interconnecting the bushing members for relative rotary engagement to prevent axial displacement of the members and to seal the bearing surfaces from penetration of foreign matter. A lubricating material may be compounded directly into the rubber ribs, or a suitable lubricant separate from the rubber may be packed between the ribs. In the latter case the interconnecting means also functions to retain the lubricant between the bushing members.

In certain embodiments of the invention hereinafter described, axial bearing surfaces of the bushing members are in the form of intermeshing helical ribs generally resembling screw threads, at least one of the threaded bearing surfaces being of resilient rubber. In these embodiments the assembly is installed with its bushing members threaded together to a neutral position midway between the limits of a predetermined range of rotary oscillation. When the bushing members are oscillated by pivotal movement of the parts with which the assembly is associated, the bushing members are threaded through one another until their respective ribs are "bottomed" at the range limits, and movement of the bushing members beyond the range limits tends to distort the rubber portions of the bearing surfaces. Thus these threaded embodiments provide for substantially unimpeded rotary movement through the desired oscillation range but provide a marked snubbing action to oppose movement of the bushing members beyond the desired oscillation range. These threaded embodiments are therefore especially suitable for use in automobile suspension linkages.

The term "rubber" in this specification means both natural rubber and synthesized materials having the elasticity and resilience characteristic of natural rubber.

Different forms of bushing assemblies embodying this invention are shown in the accompanying drawings to which reference will be made in the further explanation of the invention.

In the drawings:

FIG. 1 is a longitudinal cross-sectional view of bushing assembly made in accordance with the invention;

FIG. 2 is a plan view of a lower control arm of a typical automobile wheel suspension link in which bushing assemblies of FIG. 1 are operatively installed;

FIG. 3 is a sectional view taken on the line 3—3 of FIG. 2; and

FIGS. 4–9 show alternate forms of bushing assemblies embodying the invention and suitable for use in an installation such as that of FIG. 2 in lieu of the bushing assembly there shown.

Figure 5:
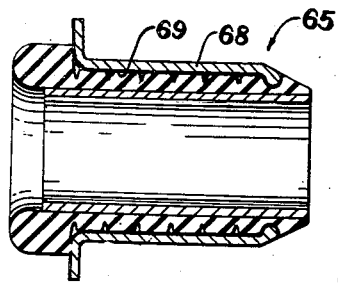

Referring to FIG. 1, the bushing assembly there shown includes an outer bushing member 10 concentrically surrounding an inner bushing member 11. The outer member 10 is formed with a metal cylindrical sleeve 13 having a circumferentially continuous annular body of resilient rubber 14 bonded to the inner surface of the sleeve 13 and formed with a cylindrical internal bearing surface 15.

The inner bushing member 11 includes a rigid tubular metal sleeve 18 having adhered to its external surface an annular circumferentially continuous layer of resilient rubber 19. The rubber layer 19 is shaped to provide a series of annular circumferential ribs 20 spaced apart from each other axially of the assembly. Each of the ribs terminates in a generally cylindrical outer surface 21 and these surfaces collectively define the bearing surface for the inner bushing member 11. The ribs 20 are of uniform height and axial width and are proportioned so that the total area of their outer surfaces 21 is equal to about 60% of the opposing cylindrical surface 15 of the outer bushing member 10 before the parts are assembled. Generally the ribs will be compressed slightly after the assembly is made. After assembly of the inner and outer bushing members the internal bearing surface 15 of member 10 which is initially made cylindrical, is compressed slightly so that it bulges somewhat into the spaces between ribs 20 as shown in FIG. 1. In the operation of this bushing the bearing surfaces 21 of the ribs 20 are adapted to rub against the opposing rubber bearing surface 15 when either of the bushing members is rotated relative to the other about their concentric axis. Radial loads whether sustained or intermittent are cushioned primarily by radial bulging of the resilient rubber ribs 20. Inasmuch as the opposing bearing surfaces are of rubber material, wear is minimized and satisfactory service life for the bushing may be obtained.

Depending on the maximum radial loads imposed on the bushing assembly, the total area of the bearing surface of the ribs (the outer surfaces 21 in FIG. 1) may range from about 30% of the opposing cylindrical bearing surface up to about 75% of the opposing bearing surface. That is to say, the ribs may be made appreciably narrower where comparatively small radial loads are imposed on the assembly.

Lubrication of the bearing surfaces may be obtained by compounding the rubber parts with suitable lubricating ingredients incorporated therein. Preferably, however, the bushing members are assembled with the spaces between the ribs 20 packed with a separate lubricant such as a grease (not indicated in drawing) which does not have deleterious effects on the rubber parts. One lubricant suitable for this purpose is a commercially available silicon grease which is insoluble in water and which is stable over a temperature range of about −40° F. to +400° F. Normally the bushing assemblies are packed with such grease when the bushing members are assembled by their manufacturer and need not be repacked for the life of the bushing. In automotive service, the bushing assemblies should remain lubricated for the normally expected life of the vehicle. However, conventional grease fittings (not shown) could be utilized to repack these bushings periodically.

The bushing members 10 and 11 are rotatably interlocked when assembled as shown in FIG. 1 by means of an annular rubber rib 25 formed on the rubber layer 14 of member 10 and which projects radially into interlocking engagement with a circumferential groove 26 in the rubber layer 19 of inner bushing member 11. The end of the rubber layer 19 is appropriately tapered as at numeral 27 to facilitate this assembly. When the outer and inner bushing members are forced axially together, the rib 25 rides up the tapering end 19 and snaps into its groove 26 and is thereafter rotatable in groove 26 during relative pivotal movement of the bushing members but precludes relative axial displacement of the bushing members. The sealing rib 25 further prevents leakage of the luubricant from the bushing assembly and also keeps water, dirt and other foreign matter from entering between the bearing surfaces. The bushing members are fitted together into an assembly as shown in FIG. 1 with or without lubricant between their respective bearing surfaces as the case may be, and the user in turn incorporates the assembly into a particular linkage desired.

The bushing of FIG. 1 is particularly designed for automotive suspension linkages and, therefore, certain portions of the rubber layers 14 and 19 are arranged to cushion axial forces imposed on the assembly. For this purpose the rubber body 14 further includes an end portion 28 which extends axially beyond the metal sleeve 13 and is adhered to a radially outward extending flange 29 at the end of sleeve 13. The end portion 28 includes an axial bearing face 30 adapted to embrace an opposing axial bearing face 31 formed on an end portion 32 of the rubber layer 19 of the inner member 11 when the bushing is assembled in a suspension linkage. The end portion 32 is seated wholly within the end portion 28 of the outer bushing member 10. As hereinafter explained, the bushing assembly is installed in a manner such that the rubber end portion 28 is axially compressed against flange 29 and squeezed about end portion 32 of the inner layer. Notwithstanding such axial compression, however, the bushing members remain relatively rotatable with substantially unimpeded pivotal movement.

In the bushing assembly of FIGS. 1–3 there is no restriction on the range through which the bushing members may be rotationally oscillated relative to each other. Normally, in these bushings the torque required to initially rotate one bushing member relative to the other (the so-called "break-away" torque) is greater than the torque required to sustain the rotary motion. However, even the break-away torque required for this assembly is very much lower than the initial torque required to deflect rubber torsion bushings of equivalent size heretofore used for this purpose. Moreover, by virtue of the ribbed configuration of one of the bearing surfaces this bushing assembly provides materially softer cushioning for radial bearing loads.

FIGS. 2 and 3 illustrate the manner in which bushing assemblies of the type shown in FIG. 1 may be installed as the pivotal connectors of the lower control arm 35 of a typical automotive wheel suspension linkage. The control arm 35 at its wide end includes two axial aligned annular bosses 36 through which project the opposite ends 37 of a pivot pin 38 adapted to be secured to the frame (not shown) of a vehicle by lugs 39. A bushing assembly as in FIG. 1 is positioned in each boss 36 about the end 37 of pin 38 as shown in detail in FIG. 3. The bushing assembly is installed preferably with its outer metal sleeve 13 pressed into boss 36 and with its inner metal sleeve 18 fastened to end 37 by a cap screw 42, a washer 43 and an annular end plate 44. The inwardly directed end of the inner sleeve 18 is plane and abuts a shoulder 45 of pin 38. To prevent inner sleeve 18 from rotating on 37 of pin 38, the outboard end of sleeve 18 is formed with serrations 47 (FIG. 1) which are engaged by intermeshing radial serrations (not shown) at the periphery of washer 43. Alternatively, the inner bushing member may be secured on end 37 by any of various available fastening devices and the serrated construction may be omitted. The end plate 44 is dish-shaped and slightly compresses the end portion 28 of the outer rubber portion 14 of the outer bushing member 10 as indicated in FIG. 3. In the operation of this assembly, the control arm 35 will be swung pivotally relative to pin 38 to rotate the outer bushing members 10 freely about their respective inner bushing members 11. Axial forces on the bushing are cushioned by the radial overlapping engagement of plate 44 with the rubber end portion 28, the outer radial face 28a of rubber portion 28 serving as a transverse bearing surface for bushing member 10 and the inner face 44a of plate 44 serving as a transverse bearing surface for the inner bushing member 11.

The bushing assembly 50 shown in FIG. 4 differs from the assembly of FIG. 1 primarily in that in the assembly 50, an outer bushing member 52 is formed wholly of metal and has a smooth internal cylindrical bearing surface 53 which bears against an opposing bearing surface 54 formed of resilient rubber ribs secured to the external surface of an inner metal sleeve 55. The outer member 52 includes a radial extending flange 57 having a radial bearing face 58 against which bears a radial bearing face 59 formed on a rubber end portion 60 of the inner member. The assembly 50 may be installed essentially in the same manner as in FIG. 3 except that the rubber end portion 60 of the inner member is radially compressed against the radial flange 57 by a plate 44. Near the opposite or inboard end of the outer member, there is an annular flange 62 which is resiliently interlocked with an annular groove 63 in the rubber body of the inner member.

The bushing assembly 65 of FIG. 5 is the same construction as that of FIG. 4 except that in FIG. 5 the interior cylindrical bearing surface of the metal outer bushing member 68 is covered with a thin coating 69 of a polymer of tetrafluoroethylene, a material more commonly known as "Teflon."

Figure 6:
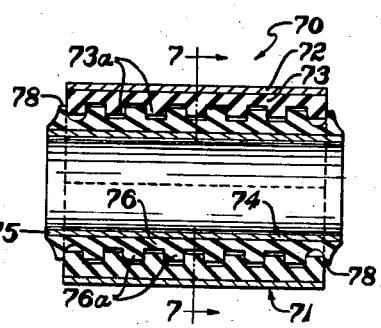
Figure 7:
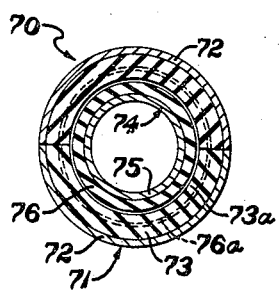

The bushing assembly 70 shown in FIGS. 6 and 7 includes an outer bushing member 71 formed of a cylindrical metal sleeve 72 having an annular body of rubber 73 secured to its internal surface. The inner bushing member 74 similarly is formed with an inner metal sleeve 75 having a circumferentially continuous rubber body 76 secured to its external surface. The rubber bodies 73 and 76 include a series of annular ribs 73a and 76a, respectively, intermeshed with each other in the manner shown. Preferably the outer bushing member 71 is longitudinally divided into a pair of mating semicylindrical sections (see FIG. 7) to facilitate the assembly of the parts. Spaces are provided between the outermost surfaces of the intermeshing ribs and the adjoining surfaces of the opposing bushing member to receive a supply of lubricant between the members. At the opposite ends of the inner bushing member 74, there are radial flanges 78 which embrace the end most ribs of outer member 71 to provide a resilient interconnection between the inner and outer member opposing relative axial displacement of the members. The bushing members are relatively rotatable with their respective ribs intermeshing. The ribs in this embodiment further provide substantial axial stability for the bushing. Installation of this assembly 70 may be like that shown in FIG. 3, except that end plate 44 may be omitted.

All the foregoing bushing assemblies are so designed that there is no restriction on the range of oscillation through which the bushing members may be rotated relative to each other. On the other hand, the bushing assemblies of FIGS. 8 and 9 described in the following remarks are designed for substantially unimpeded rotary oscillation through a definite range and provide for opposing rotary displacement of the bushing members beyond the desired range.

Figure 8:
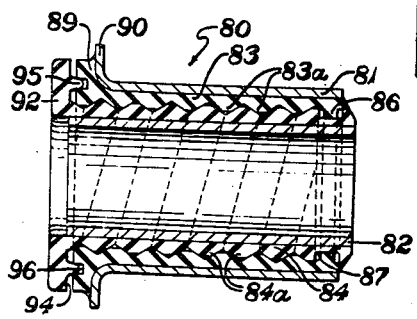

In the bushing assembly 80 of FIG. 8, the two bushing members include concentric metal sleeves 81 and 82 to which is secured, respectively, circumferentially continuous rubber bodies 83 and 84. The opposing bearing surface of the bodies 83 and 84 are in the form of intermeshing helical ribs 83a and 84a, the bushing members being threaded together with their ribs interengaged so that rotation of one bushing member relative to the other tends to advance the rotated member axially along the other member. The rubber body 83 of the outer bushing member includes an annular radially inwardly directed rib 86 at the right end of the assembly as it is viewed in FIG. 8 which rib 86 extends into an annular groove 87 in rubber body 84 of the inner member so that the rib is rotatable in this groove during relative rotary oscillation of the bushing members. The width of groove 87 is substantially wider than rib 86, the width of the groove being proportional to the desired oscillation range. Thus the relative axial travel of the bushing members is substantially arrested when the members are displaced to a position where the rib 86 engages either side of groove 87. The rib 86 also functions to retain grease or other suitable lubricant between the bushing members.

At the left end of the assembly as shown in FIG. 8, the outer rubber body 83 includes a radially outward extending annular radial end portion 89 secured to a radial end flange 90 of the outer sleeve 81. Radially overlapping portion 89 is an annular radial end portion 92 of the inner rubber body 84. In the neutral position of the bushing members, the portions 89 and 92 are normally axially-spaced from each other as shown in FIG. 8 and the rib 86 is at about the axial center of groove 87. When the outer bushing member is rotated in a direction to advance it rightward as in FIG. 8 the radial body portion 89 is eventually radially engaged with the radial body portion 92, and the resulting axial compression of these members offers appreciable snubbing action on forces tending to rotate the bushing members an additional amount. The bushing assembly is designed so that the rib 86 will be brought into engagement with the left side of groove 87 at about the same time the radial end portions 89 and 92 are engaged so that the rib 86 offers added resistance to further rotary movement of the bushing members.

On the inward radial face 94 of radial end portion 92 there is an annular lip 95 which fits into a correspondingly shaped groove 96 in the radial end face of end portion 89 to key these end portions together when they are under compression and to prevent grease from being squeezed between these end portions.

Bushing assembly 80 may be incorporated into a suspension control arm like that shown in FIG. 2 in the same manner that the bushing of FIG. 1 is installed therein. In such an assembly it will be evident that end cap 44 will embrace the end portion 92 of the inner rubber body to provide solid support for this body when the end portion 89 of the outer bushing member is urged against it. In using the threaded bushing assemblies in an installation like FIGS. 2–3, preferably the direction of the helix of the ribs is of the same hand in both bushings. Thus depending on the direction of the helix, the radial end portions of one bushing will provide a snubbing action for upward pivotal movement of the control arm relative to the frame, whereas the radial end portions of the other bushing will become engaged to snub downward pivotal movement of the control arm relative to the frame. The radial end portions of both bushings will cooperate to cushion twisting loads imposed axially on the bushings.

Figure 9:
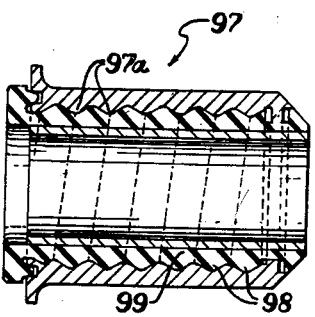

The bushing assembly 97 shown in FIG. 9 is of generally similar construction as that shown in FIG. 8 except that in FIG. 9 the outer bushing member is formed of metal and includes on its interior bearing surface a helical rib 97a which is engageable with a helical rubber rib 98 formed on a rubber layer 99 secured to the inner bushing member. The helical rib 97a may be coated with a Teflon coating as explained in connection with FIG. 5.

Depending on the service for which these bushings are used, the rigid shell portions thereof can be made of any rigid material such as molded nylon, hard rubber, etc. in lieu of metal. In all cases, however, at least one of the bearing surfaces is formed of narrow resilient rubber ribs spaced apart from each other axially of the bushing. Rubber compounds having a hardness of about 70 Shore A durometer and a durability comparable to tire tread rubber stock is generally satisfactory for the resilient rubber portions of the bushing members.

Variations in the constructions disclosed may be made within the scope of the appended claims.

What is claimed is:

1. A resilient pivotal bushing assembly comprising a pair of bushing members arranged one concentric about the other, said members having opposed bearing surfaces extending axially of the bushing assembly upon which surfaces said bushing members are rotatable relative to each other in said concentric arrangement, the bearing surfaces of each of said members being in the form of a rib disposed helically along the respective bushing members, the helical rib of one bushing member intermeshing with the helical rib of the other bushing member, at least one of said ribs being of resilient rubber, an annular resilient rubber body on one end of one bushing member, a bearing surface formed on said rubber body and disposed generally transversely of the bushing assembly and rotatably engaged with a mating transverse bearing surface on said other bushing member, said transverse bearing surfaces being pressed against each other in rotary engagement in response to axial thrust loads on the bushing assembly, and sealing means at the end of said bushing assembly opposite said transverse bearing surfaces, said sealing means including an annular rib on one bushing member and an annular channel in the other bushing member wider than said rib into which said rib projects whereby said bushing members are adapted for limited unrestricted relative rotation in reverse directions from a neutral central assembled position of said intermeshed helical ribs.

2. A bushing assembly as defined in claim 1 wherein the ribs of both bushing members are of a resilient rubber material, and wherein said transverse bearing surfaces of both bushing members are on an annular resilient rubber body.

References Cited in the file of this patent

UNITED STATES PATENTS

| | | |
|---|---|---|
| 207,313 | Smith | Aug. 20, 1878 |
| 1,510,804 | Sherwood | Oct. 7, 1924 |
| 2,069,781 | Skillman | Feb. 9, 1937 |
| 2,238,197 | Watson | Apr. 15, 1941 |
| 2,297,483 | Kuhne | Sept. 29, 1942 |
| 2,324,984 | Brown | July 20, 1943 |
| 2,696,841 | Heim | Dec. 14, 1954 |
| 2,797,929 | Herbenar | July 2, 1957 |
| 2,815,253 | Spriggs | Dec. 3, 1957 |
| 2,827,303 | Herbenar | Mar. 18, 1958 |

FOREIGN PATENTS

| | | |
|---|---|---|
| 252,016 | Great Britain | 1927 |